United States Patent
Okita et al.

(10) Patent No.: US 6,440,233 B2
(45) Date of Patent: Aug. 27, 2002

(54) ROLLING BEARING (76) Inventors: Shigeru Okita; Susumu Tanaka; Tomonobu Yoshikawa, all of c/o NSK Ltd., 5-50, Kugenumashinmei 1-chome, Fujisawa-shi, Kanagawa (JP)

( * ) Notice: Subject to any disclaimer, the term of this patent is extended or adjusted under 35 U.S.C. 154(b) by 0 days.

(21) Appl. No.: 09/817,250

(22) Filed: Mar. 27, 2001

(30) Foreign Application Priority Data

Mar. 28, 2000 (JP) ........................................ 2000-089640

(51) Int. Cl.⁷ .............................. C12D 9/36; F16C 33/32
(52) U.S. Cl. ..................... 148/319; 148/906; 384/492; 384/625
(58) Field of Search ................................ 148/319, 906; 384/492, 625

(56) References Cited

U.S. PATENT DOCUMENTS 6,048,414 A  *  4/2000 Tsushima et al. ........... 148/906
6,315,455 B1 * 11/2001 Tanaka et al. .............. 148/906

* cited by examiner

*Primary Examiner*—Deborah Yee
(74) *Attorney, Agent, or Firm*—Sughrue Mion, PLLC (57) ABSTRACT

An inner ring and an outer ring are composed as follows. These members are fabricated with a steel for bearing containing carbon 0.6 wt % or higher. A carbonitrided layer is formed in a raceway surface. The amount of residual austenite at a position of 2% Da depth in the raceway surface is determined to be 1.0 vol % or lower. Hardness at the position of 2% Da depth is set to be HRC58 or more. Nitrogen content (Np) at the position of 2% Da depth is 0.05 wt % or more. A multiple Gd of an impression resistance expressed with the following formula (1) is 1.6 or more, $$Gd = (H_{0.2}/500) + 2 \cdot Np \qquad (1),$$

wherein in the formula, $H_{0.2}$ is meant by Vickers hardness at the position of 2% Da depth.

8 Claims, 5 Drawing Sheets

ROLLING BEARING

BACKGROUND OF THE INVENTION

1. Field of the Invention

The present invention relates to a rolling bearing which is suited to use for supporting rotation in machinery requiring silence in ① use for supporting rotation of information machinery such as hard disc drive (HDD), video tape recorder (VTR), digital audio tape recorder (DAT), ② use for supporting a swinging part of a swing arm as a composing part of HDD, and ③ motors for fans or cleaners, or turbocharger for vehicle.

2. Description of the Related Art

The rolling bearing for the above usage is required to be low torque and good acoustic characteristic (low noise), and therefore composing parts of bearings as an inner ring, an outer ring or rolling elements are finish-processed at dimensionally high precision. The inner, outer rings and the rolling elements are fabricated with high carbon chromium bearing steels as SUJ2 or martensite based stainless steels as SUS440C, and then performed with hardening—tempering, so that hardness of a raceway surface is to be HRC58 to 64.

Information machinery has recently been miniaturized and often portably served, and accordingly so much exposed to risks of receiving shocks by dropping or vibrations comparing with occasions in a past. Accompanied therewith, the rolling bearings within the machinery are much probable to be injured. In a small sized ball bearing employed in portable information machinery, since a contact ellipse generated in a contacting face between a bearing ring and rolling elements is small, if adding an impact load, the contacting part is permanently deformed even if the impact load is relatively small, and the raceway surface is probably impressed with depression (impression or indentation), resulting in deteriorating an acoustic characteristic or causing irregularity in rotation torque.

As examples of the conventional arts for solving the above problem, technologies described in JP-A-7-103241 and JP-A-8-312651 may be enumerated.

According to JP-A-7-103241, the amount of a residual austenite in a steel serving as the raceway surface is decreased to be 6 vol % or less so as to heighten an impression resistance in the raceway surface, whereby the raceway surface is prevented from a permanent deformation when the rolling bearing receives the impact load. For example, the bearing ring is formed with SUJ2, and thereafter subjected to a hardening at standard temperature therefor (820 to 860° C.), and to a sub-zero treatment or a tempering treatment at relatively high temperature as 220 to 240° C., thereby reducing the amount of the residual austenite as low as possible while keeping a hardness requisite to the raceway surface.

In JP-A-8-312651, for heightening the impression resistance in the raceway surface, it is described to form the bearing ring with an ordinary bearing steel (a case-hardening steel, or high carbon chromium bearding steels as SUJL to 3), then perform a carbonitriding hardening treatment and the tempering at 350° C. or higher, thereby decreasing the amount of the residual austenite to be 0% in a steel for forming the raceway surface. It is further described to form the bearing ring with a steel which is added to SUJ2 with an element for imparting resistance against a temper softening, and perform a quench hardening and the tempering at 350° C. or higher, thereby decreasing the amount of the residual austenite to be 0% in a steel forming the raceway surface. It is also set forth to make the rolling elements of a ceramic, thereby to avoid the rolling elements from the impression by contacting with the raceway surface.

However, the above conventional technologies do not pay attention to the acoustic characteristic when being exposed to vibration, and a room is still left for also improving the acoustic characteristic when receiving impact load. That is, there is a problem that, in the rolling bearing within the machinery, fine vibrations or fluctuations given to the machinery cause fretting (a phenomenon where two faces to be contacted repeatedly cause a relative fine sliding, and thus become worn) in the contacting faces of the rolling elements and the bearing ring to deteriorate the acoustic characteristic. However, the above publications make no reference thereto.

SUMMARY OF THE INVENTION

The invention has been realized in view of problems involved with the conventional art, and accordingly it is an object of the invention to provide a rolling bearing suited to a small sized and portable information machinery, and excellent in the acoustic characteristic.

For solving the above problems, the rolling bearing according to the invention which is provided, as a bearing ring, with an outer ring and an inner ring or a shaft when a raceway surface of the inner ring is formed in the shaft, is characterized in that, of the inner ring (or the shaft) and an outer ring, at least the inner ring (or the shaft) is fabricated with a bearing steel of carbon being 0.6 wt % or higher and has a carbonitrided layer in the raceway face thereof, and a multiple Gd of an impression resistance expressed with the following formula (1) is 1.6 or more by nitrogen content percentage (wt %): Np at a position (a position of 2% Da depth) to be from the surface of the raceway to a side of a core portion by the amount of a dimension corresponding to 2% of a diameter of a rolling element and by Vickers hardness (Hv): $H_{0.2}$ at said position of 2% Da depth.

$$Gd = (H_{0.2}/500) + 2 \cdot Np \qquad (1).$$

In the rolling bearing of the invention which is provided, as the bearing ring, with the outer ring and the inner ring or the shaft that the raceway surface of the inner ring is formed in the shaft, it is preferable that at least the inner ring (or the shaft) of the inner ring (or the shaft) and an outer ring is fabricated with a bearing steel of carbon being 0.6 wt % or higher, has a carbonitrided layer in the raceway face thereof, and at the position (the position of 2% Da depth) from the surface of the raceway to the side of the core portion by the amount of a dimension corresponding to 2% of the diameter of the rolling element, the amount of a residual austenite is 1.0 vol % or lower, the hardness at the above-mentioned position (the position of 2% Da depth) is HRC58 or more in Rockwell hardness (Hv653 or more in Vickers hardness), the nitrogen content at the above-mentioned position is 0.05 wt % or higher, and the multiple Gd of the impression resistance expressed with the following formula (1) by the nitrogen content percentage (wt %): Np and by Vickers hardness (Hv): $H_{0.2}$ at the above-mentioned position is 1.6 or more.

$$Gd = (H_{0.2}/500) + 2 \cdot Np \qquad (1).$$

Inventors found that even if the carbonitrided layer formed in the raceway surface has the same hardness, the higher the nitrogen content in the carbonitrided layer, the better the impression resistance. A book entitled "Elastic coefficient of metal materials" (October 1980) issued by Japan Machinery Society, mentions at page 11 "it is considered that with respect to the elastic coefficient of an alloy in solid solution, in case a solute atom is an interstitial atom, crystal lattice is largely disturbed and the elastic coefficient is inevitably lowered." As mentioned, it is assumed that even if the hardness is the same, the higher the nitrogen content, the lower the elastic coefficient in the carbonitrided layer. That is, although the carbonitrided layer of the same hardness is formed in the raceway surface, if nitrogen content is higher in the carbonitriding layer, an elastic deformability is higher in the raceway surface, so that the contacting surface pressure with the rolling elements is small and the impression is less to occur.

The invention specifies the nitrogen content to be 0.05 wt % or higher in a position where a maximum shearing stress in a depth direction of the carbonitrided layer is added (such a position to be from the raceway surface to the side of the core portion by the amount of the dimension corresponding to 2% of the diameter of the rolling element). With this structure, and an elastic deformability requisite to an excellent impression resistance is given to the carbonitrided layer.

By specifying the nitrogen content to be 0.05 wt % or higher in the above-mentioned position in the carbonitrided layer, an abrasion amount by an adhesion abrasion is reduced at the contact surface between the rolling element and the bearing ring, and an abrasion resistance is increased. Accompanied therewith, as the contacting face between the rolling element and the bearing ring is difficult to generate fretting injuries, in case fine vibration or fluctuation is added, a deteriorating degree in the acoustic characteristic of the rolling bearing can be lessened. It is preferable that the nitrogen content at the above-mentioned position is 0.1 wt % or higher. If the nitrogen content is higher, the impact resistance and the fretting resistance are increased, and so, more preferably 0.2 wt %, but in contrast, as a grindability is worsened, preferable is 0.6 wt % or lower as seen in A-10 of Table 4.

The multiple Gd of the impression resistance expressed with the formula (1) shows a total value of the hardness in the raceway surface+the elastic deformability, and if the Gd is 1.6 or higher, an excellent impression resistance (impact resistance) is obtained. The higher the more preferable the multiple Gd of the impression resistance, and in particular, although an upper limit in the performance is not specified, the higher the multiple Gd of the impression resistance, the higher costs to be required for materials or thermal treatments. Therefore, the multiple Gd of the impression resistance should be determined in relation with the costs. If the Gd is large, a grinding time is lengthened, and preferable is 2.7 or less as seen in A-10 of Table 4.

The invention specifies the hardness at the depth position of the raceway surface (the position to be from the raceway surface to the side of the core portion by the amount of the dimension corresponding to 2% of the diameter of the rolling element) to be HRC58 or more in Rockwell hardness (Hv653 or more in Vickers hardness). Thereby, the hardness in the raceway surface necessary as the bearing can be held. The hardness in the raceway surface at the depth position is preferably HRC60 (Hv697) or more.

In the invention, of the inner ring and an outer ring, at least the inner ring is fabricated with a bearing steel of carbon being 0.6 wt % or higher. Herein, the bearing steel is meant by an iron-steel material having a composition which can exhibit a performance requisite as the bearing. As such bearing steels, listed are, for example, high carbon chromium bearing steels of SUJL to SUJ5, SUS440C, 13Cr-martensite based stainless steel, or SCR420.

The bearing ring fabricated with such a bearing steel containing carbon 0.6 wt % or higher is carried out with the carbonitriding treatment, followed by tempering at e.g., 250 to 320° C., thereby enabling to specify the amount of the residual austenite to be 1.0 vol % or lower at the position (of 2% Da depth) to be from the raceway surface to the side of the core portion by the amount of the dimension corresponding to 2% of the diameter of the rolling element, and specify the hardness in the raceway surface and the hardness at the depth position to be HRC58 or more.

Further, it is preferable that the sub-zero treatment is carried out after the carbonitriding treatment, so that the residual austenite is induction-transformed to decrease the amount of the residual austenite, and subsequently the tempering is practiced. When the residual austenite is dissolved as much as possible before tempering by practicing the sub-zero treatment before the tempering, the lattice of the martensite structure is much disordered after the carbonitriding treatment, and the lowering action of the elastic coefficient caused by the carbonitriding treatment as mentioned above is accelerated.

In the invention, it is sufficient that of the inner ring and the outer ring, at least the inner ring has the above mentioned structure, and preferably each of the inner and outer rings has such a structure.

The invention does not make a special limitation to the rolling elements, and allows any sorts made of the conventionally used SUJ2, ceramic, or stainless. In case the rolling element is made of ceramic, the fretting resistance is by far improved comparing with metal-made rolling elements, but in case the bearing ring is as conventional, since a large surface contacting pressure between the raceway surface and the ceramic-made rolling elements is generated, the impression resistance in the raceway surface is lowered.

On the other hand, in the rolling bearing of the invention, since the bearing ring is fabricated as above mentioned, the impression resistance in the raceway surface can be kept high, in spite of the ceramic-made rolling elements. Accordingly, in the rolling bearing of the invention, while the impression resistance in the raceway surface can be kept high by using the ceramic-made rolling elements, a higher fretting resistance can be provided.

As the rolling element composing the rolling bearing of the invention, it is desirable that the rolling element is fabricated with a stainless steel containing Cr 8 wt % or higher (preferably, 12 wt % or higher), a nitride layer is formed in the surface by a nitriding treatment, and a core portion contains nitrogen and carbon contents of 0.45 wt % or higher in a total amount. Thus, by containing nitrogen and carbon contents of 0.45 wt % or higher in the total amount, the core portion is avoided from softening by tempering at high temperature after the nitriding treatment.

If the nitride forming elements such as Mo, V, W, Nb, Al, Si or others are added in said stainless steel, fine nitrides thereof are formed to more heighten durability of the rolling element, and it is preferable to properly add these elements in view of costs.

It is preferable that a surface layer of the rolling element has anitrided layer of Vickers hardness (Hv) being 1000 or more. Further, as a combination of the rolling elements and the bearing ring (the inner ring or the shaft having raceway surface of the inner ring, and the outer ring), it is preferable that a difference between the surface hardness of the rolling element and the hardness of a truck surface of the bearing ring or at the position of 2%Da depth, is Hv300 or higher, more preferably Hv500 or more. Thereby, the fretting resistance is particularly made excellent, and the impact resistance (the impression resistance) is maintained high.

DETAILED DESCRIPTION OF THE PREFERRED EMBODIMENTS

Reference will be made to the mode for carrying out the invention.

Figure 1:
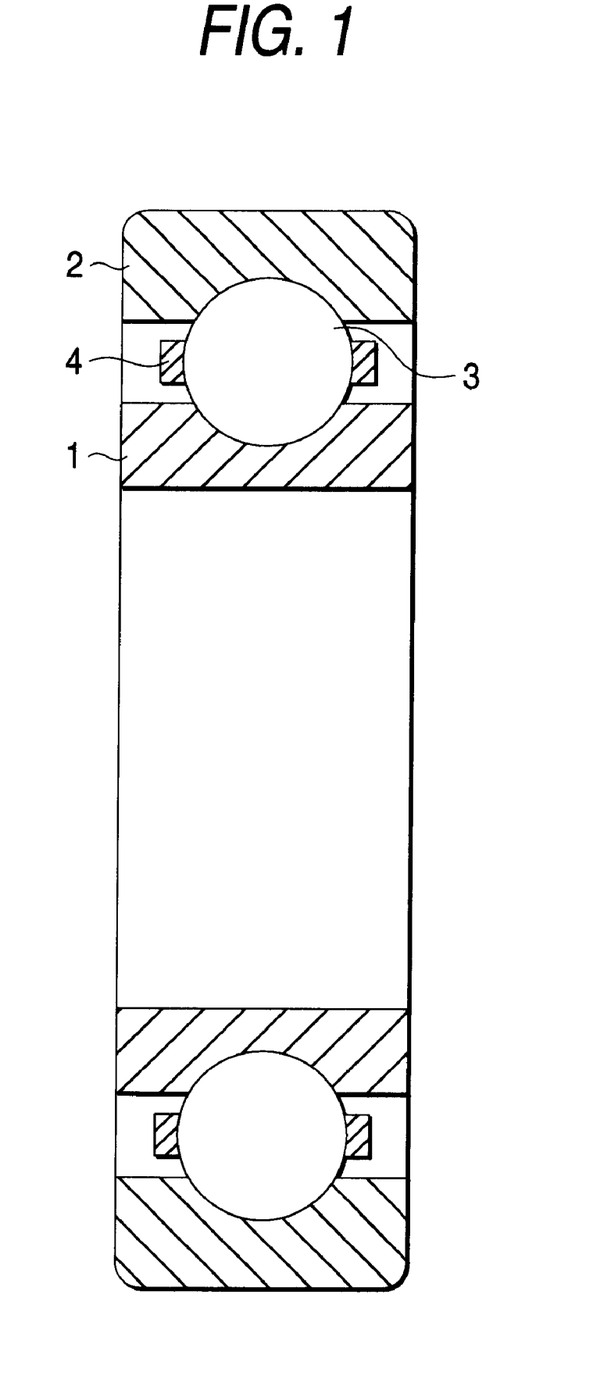
FIG. 1 is a cross sectional view showing the rolling bearing corresponding to one embodiment of the invention.

FIG. 1 is a cross sectional view showing the rolling bearing corresponding to one embodiment of the invention. This rolling bearing is a ball bearing composed of the inner ring 1, the outer ring 2, the balls (rolling elements) 3, and a retainer 4. In this embodiment, the ball bearing of JIS bearing No. 695 was made by changing materials and the heat treating conditions of the inner ring 1, the outer ring 2 and the ball 3, and.

The inner 1 and the outer ring 2 were formed into predetermined shapes with the iron-steel materials shown in Table 1, followed by the carbonitriding treatment or the hardening treatment and the tempering under the conditions shown in Table 2. Some of them were carried out with the sub-zero treatment. In Table 2, "$NH_3$ density" is meant by "the density of ammonia gas to be added in Rx gas", and "Surface processing" is a shot-peening process. By the shot-peening process, the surface is hardened.

As to the ball (rolling element) 3, used were the SUJ2-made ball (the surface hardness: Hv780) which are ordinarily used JIS bearing No. 695 made by Nippon Seiko (K.K.), or the materials shown in Table 3. The B1-, B2-, B3-made balls in Table 3 were performed with the nitriding treatment, and the surface hardness was at the value shown in Table 3.

TABLE 1

|  | Kinds of steel | C (Wt %) | Si (Wt %) | Mn (Wt %) | Cr (Wt %) |
|---|---|---|---|---|---|
| Inner ring & Outer ring | SUJ2 | 1.02 | 0.28 | 0.34 | 1.50 |
|  | SUJ3 | 1.01 | 0.55 | 1.06 | 1.12 |
|  | K1 | 0.85 | 0.43 | 0.91 | 0.52 |
|  | K2 | 0.68 | 0.28 | 0.98 | 0.80 |
|  | K3 | 0.55 | 0.24 | 1.05 | 1.04 |

TABLE 2

|  | Treating temp | Treating | NH3 density | Sub-zero | Tempering temp | Surface process-ing |
|---|---|---|---|---|---|---|
| A | 800~860 | Carbo-nitriding | 3~5% | Presence | 250~290 | Absence |
| B | 800~860 | Carbo-nitriding | 5~8% | Presence | 250~290 | Absence |
| C | 800~860 | Carbo-nitriding | 8~15% | Presence | 250~290 | Absence |

TABLE 2-continued

|  | Treating temp | Treating | NH3 density | Sub-zero | Tempering temp | Surface process-ing |
|---|---|---|---|---|---|---|
| D | 800~860 | Carbo-nitriding | 3~5% | Absence | 250~290 | Absence |
| E | 800~860 | Carbo-nitriding | 3~5% | Presence | 300~340 | Absence |
| F | 800~860 | Carbo-nitriding | 3~5% | Presence | 350~400 | Absence |
| G | 800~860 | Carbo-nitriding | 3~5% | Presence | 160~200 | Absence |
| H | 820~860 | Hardening | 0 | Presence | 220~250 | Absence |
| I | 820~860 | Hardening | 0 | Absence | 220~250 | Absence |
| J | 820~860 | Hardening | 0 | Presence | 250~290 | Absence |
| K | 820~860 | Hardening | 0 | Presence | 300~340 | Absence |
| L | 820~860 | Hardening | 0 | Presence | 160~200 | Absence |
| M | 850~900 | Hardening | 0 | Presence | 220~250 | Absence |
| N | 820~860 | Hardening | 0 | Presence | 220~250 | Presence | temp: temperature

TABLE 3

|  |  | C (Wt %) | Cr (Wt %) | N (Wt %) | C + N (Wt %) | Hardness (HV) |
|---|---|---|---|---|---|---|
| Rolling elements | $Si_3N_4$ | — | — | — | — | 1470 |
|  | B1 | 0.45 | 13.01 | 0.14 | 0.59 | 1320 |
|  | B2 | 0.39 | 15.98 | 0.09 | 0.48 | 1350 |
|  | B3 | 1.03 | 17.32 | — | 1.03 | 1265 |

These inner rings, outer rings and balls were combined as shown in Tables 4 and 5 to produce the rolling bearings of Sample Nos. A-1 to A-21 (Examples) and B-1 to B-15 (Comparative Examples). The used inner ring and the outer ring of each sample were produced with the same materials and under the same conditions. The retainer 4 was made of plastic. As lubricants, rust proofing oil and mineral oil based grease were used.

As to the inner rings and the outer rings, measurements were made to the amount (vol %) of residual austenite to the position (of 2% Da depth) from the raceway surface to be side of the core portion by the amount of the dimension-corresponding to 2% of the ball diameter: $\gamma_R$, the Vickers hardness (Hv) at the position of 2% Da depth: $H_{0.2}$, and the nitrogen content (wt %) at the position of 2% Da depth: Np.

From the measured values of $H_{0.2}$ and Np, the multiple Gd of the impression resistance was calculated by using the above formula (1). These results are shown in Tables 4 and 5.

The amount of the residual austenite was measured by an X-ray diffraction method. The nitrogen content (Np) at the position of 2% Da depth was measured by analyzing the nitrogen content in cross section of the raceway groove in a depth direction by using an EPNA apparatus. With respect to the Vickers hardness ($H_{0.2}$) at the position of 2% Da depth, the face of the truck groove was ground to expose the position of 2% Da depth in cross section of the groove, and the Vickers hardness in the exposed face was directly measured by 100 g of the testing load.

In regard to the bearing of each Sample, the impact resistance and the fretting resistance were measured as follows.

Firstly, the bearing of each Sample was effected with pre-load of 1.2 kgf in an axial direction, and acceleration (G value) of an axial vibration when rotating at 1800 rpm was measured as an initial value. Next, the axial load of 1.2 kgf was added, and the G value was measured when rotating under the same condition. Subsequently, the axial load was set to be 5 kgf, and as to the following load, the G value was repeatedly measured by rotating under the same condition, while increasing the axial load by 0.5 kgf. The load value of the impact resistance was determined by the axial load when the measured value of the G value was increased by 20 mG than the initial value.

As to the load value of the impact resistance of each Sample, the load value of the impact resistance of Sample No. B-6 was made a reference ("1.00") for calculating relative values. With the relative values, the relative impact resistance (the impression resistance) of each Sample was evaluated. It is meant that the larger the value, the higher the impact resistance (the impression resistance). The values are also shown in Tables 4 and 5.

In regard to the fretting resistance, tests were made by turning the bearings under the conditions of pre-load: 1.2 kgf, swinging angle: 2°, swinging frequency: 27 Hz, and swinging number: 300,000 times. Before and after the swinging test, the acoustic value (the G value of said conditions) was measured for calculating the amount of deterioration of the acoustic value by the swinging tests.

Concerning the amount of deterioration of the acoustic value of each Sample, the value of Sample No. B-6 was made a reference ("1.00") for calculating relative values. With the relative values, the relative fretting resistance of each Sample was evaluated. It is meant that the smaller the value, the higher the fretting resistance. The values are also shown in Tables 4 and 5.

TABLE 4

| | | Kinds of steel | | | | | | Shock resistance | Fretting resistance |
|---|---|---|---|---|---|---|---|---|---|
| | | Inner, | | Inner ring & Outer ring | | | | | |
| Ex./ Com. | No. | outer rings | Rolling elements | Heating treatment | $\gamma R$ (vol %) | $H_{0.2}$ | Np (wt %) | Gd | (Relative value) | (Relative value) |
| Ex. | A-1 | SUJ2 | SUJ2 | A | 0 | 770 | 0.08 | 1.70 | 1.43 | 0.45 |
| | A-2 | SUJ2 | SUJ2 | A | 0 | 768 | 0.12 | 1.78 | 1.43 | 0.43 |
| | A-3 | SUJ2 | SUJ2 | A | 0.5 | 779 | 0.13 | 1.82 | 1.48 | 0.41 |
| | A-4 | SUJ2 | SUJ2 | A | 0 | 774 | 0.15 | 1.85 | 1.48 | 0.38 |
| | A-5 | SUJ2 | SUJ2 | B | 0 | 781 | 0.24 | 2.04 | 1.52 | 0.36 |
| | A-6 | SUJ2 | SUJ2 | B | 0 | 776 | 0.28 | 2.11 | 1.57 | 0.36 |
| | A-7 | SUJ2 | SUJ2 | B | 0 | 780 | 0.36 | 2.28 | 1.57 | 0.35 |
| | A-8 | SUJ2 | SUJ2 | C | 0 | 778 | 0.38 | 2.32 | 1.62 | 0.34 |
| | A-9 | SUJ2 | SUJ2 | C | 0 | 780 | 0.43 | 2.42 | 1.62 | 0.34 |
| | A-10 | SUJ2 | SUJ2 | C | 0 | 782 | 0.55 | 2.66 | 1.67 | 0.32 |
| | A-11 | SUJ2 | SUJ2 | D | 0 | 714 | 0.09 | 1.61 | 1.33 | 0.52 |
| | A-12 | SUJ2 | SUJ2 | D | 0 | 715 | 0.11 | 1.65 | 1.38 | 0.49 |
| | A-13 | SUJ2 | SUJ2 | E | 0 | 708 | 0.10 | 1.62 | 1.33 | 0.51 |
| | A-14 | SUJ2 | SUJ2 | E | 0 | 693 | 0.11 | 1.61 | 1.29 | 0.53 |
| | A-15 | SUJ3 | SUJ2 | A | 0 | 762 | 0.13 | 1.78 | 1.43 | 0.43 |
| | A-16 | K1 | SUJ2 | A | 0 | 735 | 0.13 | 1.73 | 1.38 | 0.45 |
| | A-17 | K2 | SUJ2 | A | 0 | 704 | 0.13 | 1.67 | 1.33 | 0.42 |
| | A-18 | SUJ2 | $Si_3N_4$ | A | 0 | 779 | 0.13 | 1.82 | 1.76 | 0.18 |
| | A-19 | SUJ2 | B1 | A | 0 | 779 | 0.13 | 1.82 | 1.81 | 0.17 |
| | A-20 | SUJ2 | B2 | A | 0 | 779 | 0.13 | 1.82 | 1.76 | 0.18 |
| | A-21 | SUJ2 | B3 | A | 0 | 779 | 0.13 | 1.82 | 1.71 | 0.18 |

Ex./Com.: Example/Comparative Example
Ex.: Examples

TABLE 5

| | | Kinds of steel | | | | | | Shock resistance | Fretting resistance |
|---|---|---|---|---|---|---|---|---|---|
| | | Inner, | | Inner ring & Outer ring | | | | | |
| Ex./ Com. | No. | outer rings | Rolling elements | Heating treatment | $\gamma R$ (vol %) | $H_{0.2}$ | Np (wt %) | Gd | (Relative value) | (Relative value) |
| Com. | B-1 | SUJ2 | SUJ2 | F | 0 | 648 | 0.15 | 1.60 | 1.10 | 0.85 |
| | B-2 | SUJ2 | SUJ2 | A | 0 | 758 | 0.04 | 1.60 | 1.24 | 0.95 |
| | B-3 | SUJ2 | SUJ2 | G | 34 | 782 | 0.08 | 1.72 | 0.86 | 0.92 |
| | B-4 | K3 | SUJ2 | A | 0 | 669 | 0.13 | 1.60 | 1.05 | 0.95 |
| | B-5 | SUJ2 | SUJ2 | H | 0 | 698 | 0 | 1.40 | 1.04 | 1.04 |
| | B-6 | SUJ2 | SUJ2 | I | 0 | 645 | 0 | 1.29 | 1.00 | 1.00 |
| | B-7 | SUJ2 | SUJ2 | J | 0 | 607 | 0 | 1.21 | 0.95 | 1.25 |
| | B-8 | SUJ2 | SUJ2 | K | 0 | 584 | 0 | 1.17 | 0.95 | 1.25 |
| | B-9 | SUJ2 | SUJ2 | L | 10 | 743 | 0 | 1.49 | 0.81 | 1.36 |
| | B-10 | SUJ2 | SUJ2 | M | 0 | 752 | 0 | 1.50 | 1.10 | 0.98 |
| | B-11 | SUJ2 | SUJ2 | N | 0 | 816 | 0 | 1.63 | 1.24 | 1.02 |
| | B-12 | SUJ2 | $Si_3N_4$ | H | 0 | 698 | 0 | 1.40 | 0.86 | 0.24 |
| | B-13 | SUJ2 | B1 | H | 0 | 698 | 0 | 1.40 | 0.90 | 0.22 |
| | B-14 | SUJ2 | B2 | H | 0 | 698 | 0 | 1.40 | 0.86 | 0.25 |
| | B-15 | SUJ2 | B3 | H | 0 | 698 | 0 | 1.40 | 0.81 | 0.27 |

Ex./Com.: Example/Comparative Example
Com.: Comparative Examples

Figure 2:
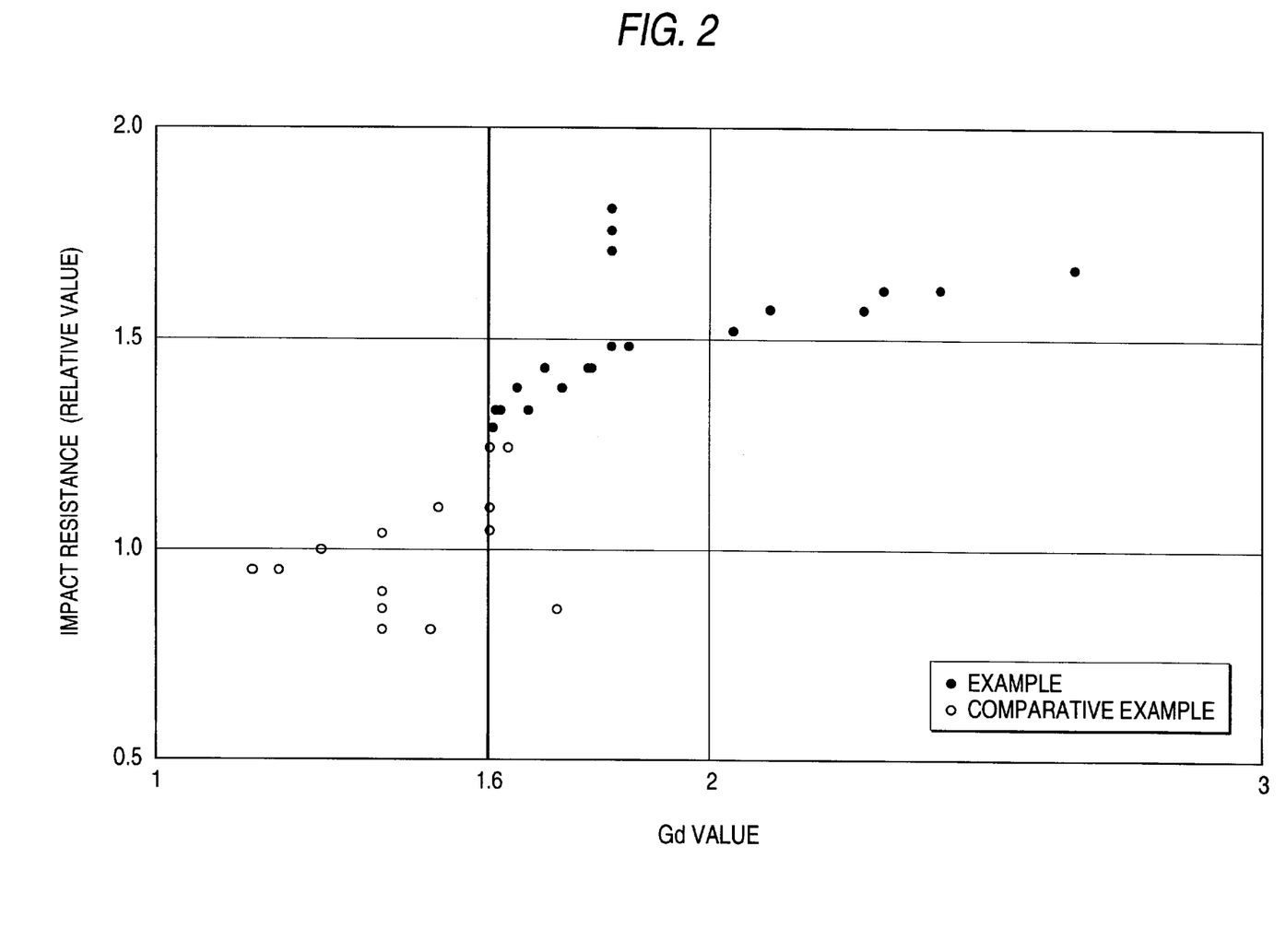
FIG. 2 is a graph showing the relationship between the Gd value and the impact resistance obtained from the tested results of the embodiments.
Figure 3:
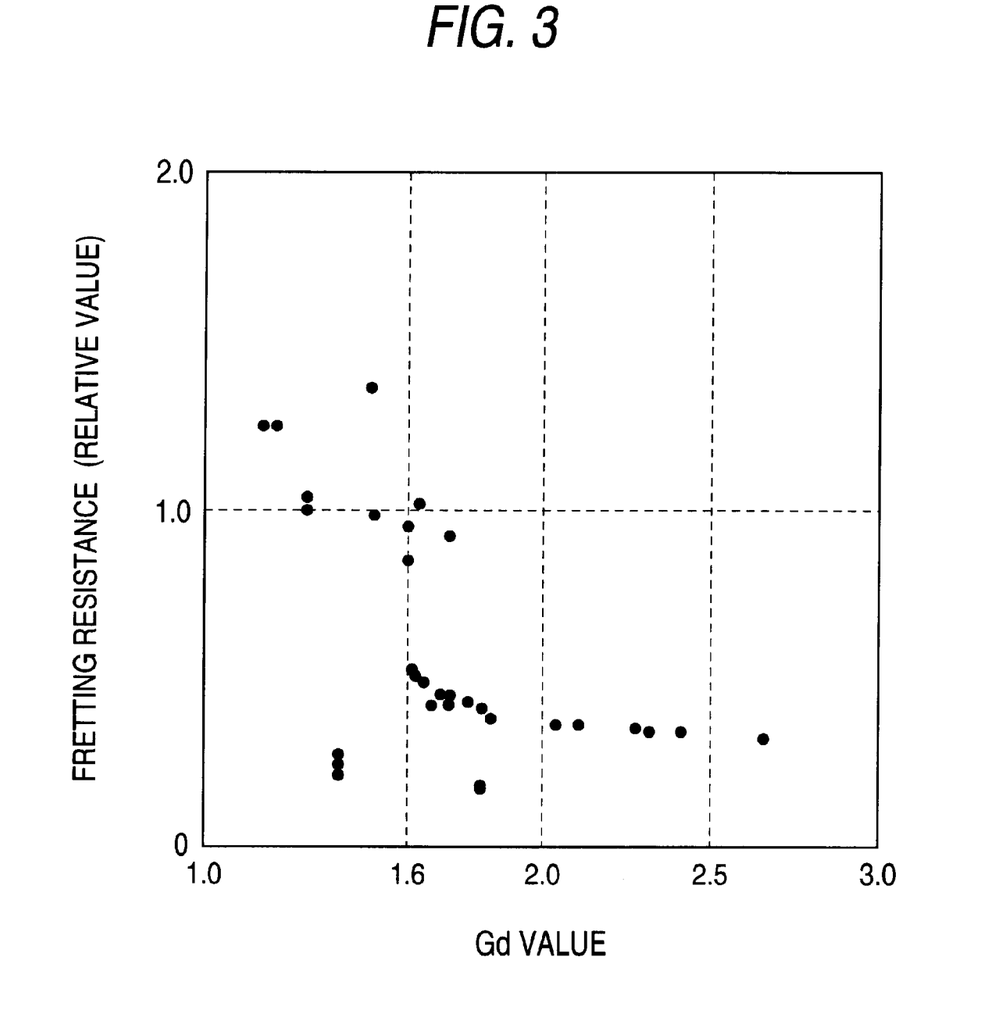
FIG. 3 is a graph showing the relationship between the Gd value and the fretting resistance obtained from the tested results of the embodiments.
Figure 4:
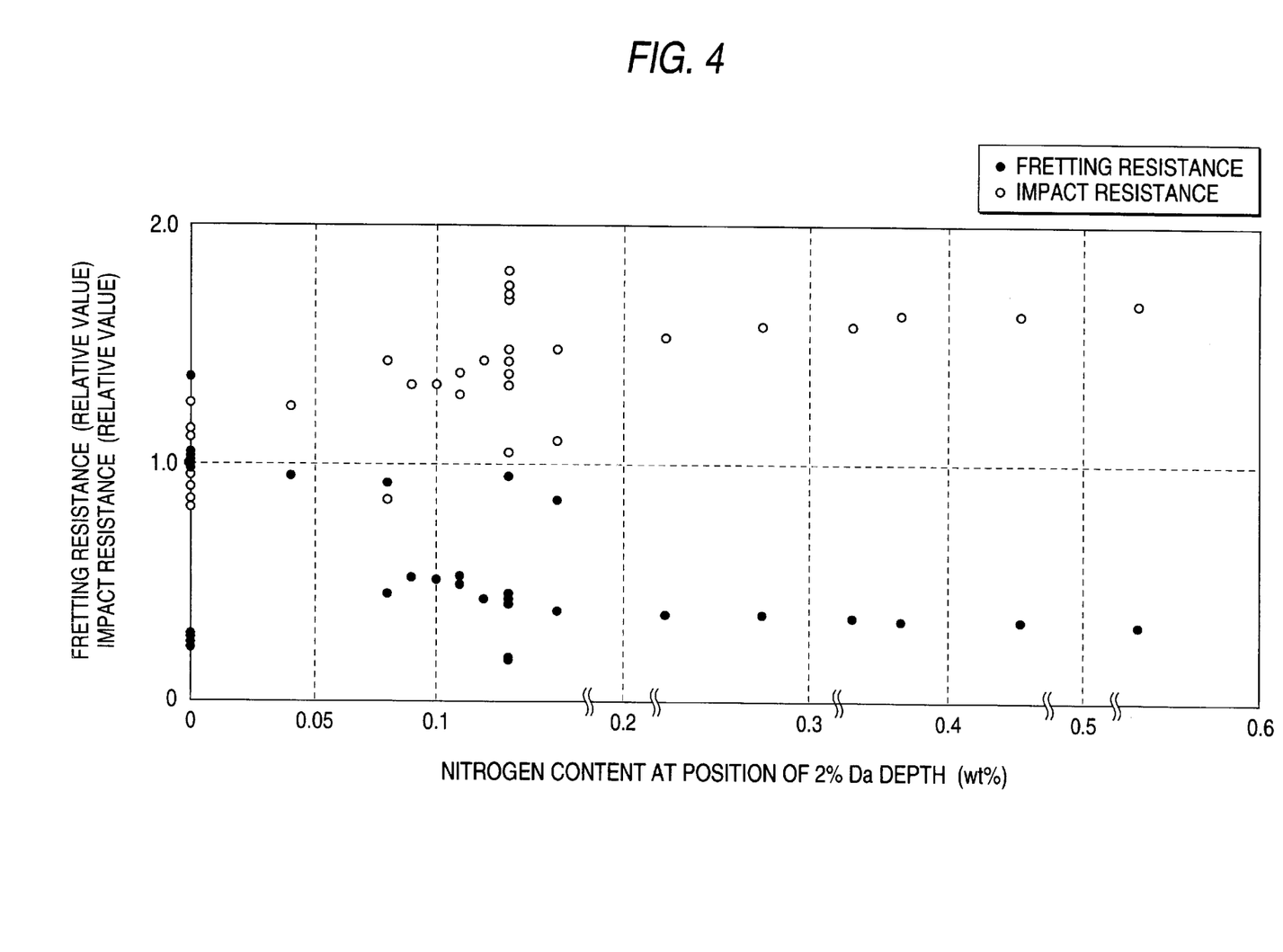
FIG. 4 is a graph showing the relationship among the nitrogen content percentage (Np value) at the position of 2% Da depth and the fretting resistance (relative value) and the impact resistance (relative value) obtained from the tested results of the embodiments.

The relationship between the Gd value and the impact resistance (relative values) obtained from these results is shown in FIG. 2, the relationship between the Gd value and the fretting resistance (relative values) is shown in FIG. 3, and the relationship among the nitrogen content percentage (Np value) at the position of 2% Da depth and the fretting resistance (the relative value) and the impact resistance (the relative value) is shown in FIG. 4.

Figure 5:
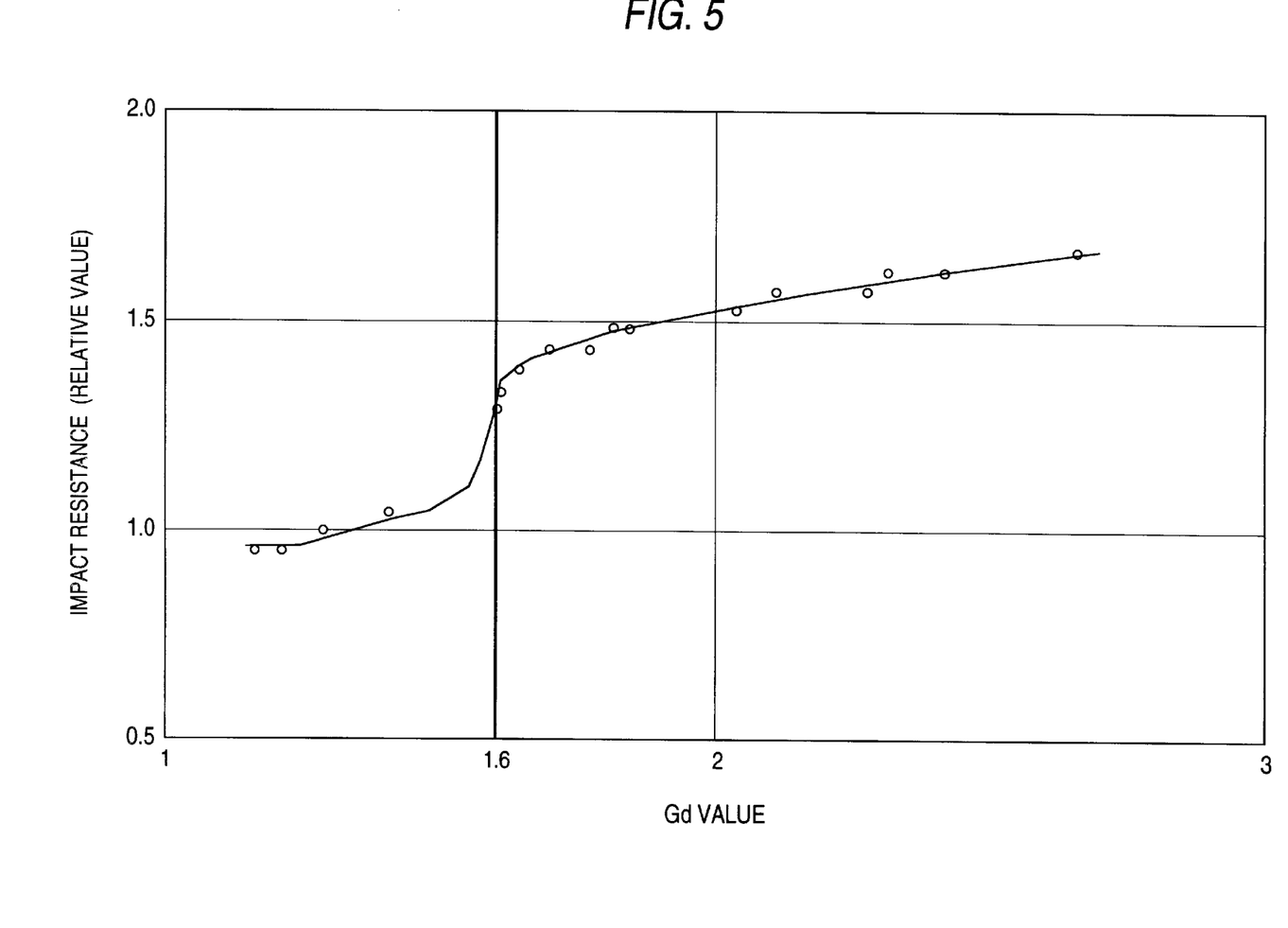
FIG. 5 is a graph showing the relationship between the Gd value and the impact resistance (the relative value) obtained from the data of Samples where the inner, outer rings and the rolling elements are made of SUJ2, and treated with the ordinary hardening and carbonitriding.

FIG. 5 is a graph showing the relationship between the Gd value and the impact resistance (relative values) obtained from the data of Samples where the inner, outer rings and the rolling element are made of SUJ2, and treated with the ordinary hardening and carbonitriding. Namely, this graph is provided with the data intentionally excluding from the data of Tables 4 and 5 the members which were carried out with the especial heating treatment or process.

As the eliminated data, there are those of changing materials for the inner and outer rings, some where the amount of residual austenite was intentionally caused to remain by the tempering at low temperatures or the hardness is lowered by the tempering at higher temperatures than necessarily, ones which were thermally processed to knowingly decrease Np, those hardened at high temperatures beyond ordinary ranges, or ones forcibly processed after the thermal treatment.

From the graph in FIG. 5, it is seen that when the multiple Gd of the impression resistance expressed with the formula (1) is beyond 1.6 (the range of the invention), the impact resistance is remarkably heightened.

As is seen from these results, the bearings of Examples A-1 to A-21 are all superior to the bearings of Comparative example B-6 in the impact resistance (the impression resistance) and the fretting resistance. Examples A-1 to A-21 satisfy all the conditions where the inner and outer rings are fabricated with the bearing steel containing carbon 0.6 wt % or higher, the raceway surface has the carbonitrided layer, the residual austenite amount at the position of 2% Da depth is 1.0 vol % or lower, the Vickers hardness $H_{0.2}$ at the position of 2% Da depth Hv653 (HRC58) or more, the nitrogen content (Np) at the position of 2% Da depth is 0.05 wt %, and the multiple Gd of the impression resistance expressed with the formula (1) is beyond 1.6.

In contrast, the bearings of Comparative Examples B-1 to B-15 not satisfying at least one of these conditions are inferior to the bearings of Examples A-1 to A-21 in any of the impact resistance (the impression resistance) and the fretting resistance.

That is, Samples (B-1 to B-4 and B-11) satisfying the condition of the GD value being 1.6 or more are inclined to be good in the impact resistance and the fretting resistance. However, since, in the bearing of B-1, the tempering temperatures of the inner ring and the outer ring were too high as 350 to 400° C., the Vickers hardness $H_{0.2}$ at the position of 2% Da depth was less than Hv653 (HRC58). Consequently, the impact resistance and the fretting resistance were not so much available.

In the bearing of B-2, since the nitrogen content (Np) at the position of 2% Da depth was less than 0.05 wt %, an increasing effect of the fretting resistance was little. Since, in the bearing of B-3, the residual austenite amount forming the raceway surface was very much as 34 vol %, the impact resistance was bad, and the increasing effect of the fretting resistance was also little.

In the bearing of B-4, since the inner and outer rings were fabricated with the steel containing C less than 0.6 wt %, the increasing effects of the impact resistance and the fretting resistance were little. In the bearing of B-11, since the inner and outer rings were heat-treated and performed with the shot-peening to increase the hardness in the raceway surface, the increasing effect of the impact resistance was available. However, since the carbonitrided layer was not formed in the raceway surfaces of the inner and outer rings, the increasing effect of the fretting resistance was hardly provided.

In the bearings of B-5 to B-8, B-10 and B-12 to B-15, the residual austenite amount of the steel forming the raceway surface was 0%, since not satisfying the condition of the Gd value being 1.6 or more, those were not good in each of the impact resistance and the fretting resistance.

On the other hand, in the comparison made in Examples A-1 to A-21, the bearings of A-18 to A-21 using the rolling elements (ball) other than SUJ2-made ball were in particular excellent in each of the impart resistance (the impression resistance) and the fretting resistance. This is why the inner and outer rings satisfies all the conditions, and the difference between hardness in the balls (Hv1320 to 1470) and the hardness (Hv698) in the raceway surfaces of the SUJ2-made inner and outer rings is large as 300 or more. Beside, in the bearings of A-18 to A-20, the difference between the hardness in the ball surface and the hardness in the surface of the raceway grooves of the inner and outer rings and at the position of 2% Da depth is Hv500 or more, and so those are more excellent in the impact resistance and the fretting resistance. Namely, the impact resistance is heightened by decreasing of the surface pressure in the raceway surface, and the fretting resistance is heightened by providing the carbonitrided layer.

Although the difference in hardness between the ball and the raceway surfaces of the inner and out rings is large as Hv300 or more, if the inner and outer rings do not satisfy all of the conditions, the fretting resistance is excellent but the impact resistance (the impression resistance) is bad as the bearings of B-12 to B-15.

In Examples A-1 to A-14 where the only heat treating condition of the inner and outer rings is different, the bearings of A-11 to A-14 are somewhat inferior to those of A-1 to A-10 in the impact resistance and the fretting resistance. Among them, those of A-11 and A-12 are not carried out with the sub-zero treatment prior to the tempering. In those of A-13 and A-14, the tempering temperatures are higher as 300 to 340° C. than those of other Samples (250 to 290° C.). Accordingly, as the heat treating condition for the inner and outer rings, it is desirable to carry out the sub-zero treatment prior to the tempering and determine the tempering temperature to be 250 to 290° C.

As is seen from the graph in FIG. 2, if the Gd value of the inner and outer rings becomes 1.6 or more, the impact resistance is good, and the larger the Gd value, the higher the increasing effect of the impact resistance, but if the Gd value becomes 2.0 or more, the increasing effect of the impact resistance is slowly saturated. As is seen from the graph in FIG. 3, if the Gd value becomes 1.6 or more, the fretting resistance is good, and the larger the Gd value, the higher the increasing effect of the fretting resistance, but if the Gd value becomes 2.0 or more, the increasing effect of the fretting resistance is slowly saturated.

Therefore, if the Gd value is made larger than necessarily, the increasing effect of the impact resistance and the fretting resistance is saturated to invite increase of costs to be taken for the heating treatment or process, and so it is preferable the Gd value of the inner and outer rings is 1.6 to 3.0.

As is seen from the graph of FIG. 4, if the nitrogen content (Np) at the position of 2% Da depth of the inner and outer rings is 0.05 wt % or higher, the impact resistance and the fretting resistance are good, and the larger the Gd value, the higher their increasing effects. In particular, if the nitrogen content (Np) at the position of 2% Da depth is 0.1 wt % or higher, their increasing effects are higher. However, if the Np value exceeds 0.6 wt %, the grinding workability is lowered, and it is preferable that the nitrogen content (Np) at the position of 2% Da depth of the inner and outer rings is 0.05 to 0.6 wt %, more preferably 0.1 to 0.6 wt %.

This embodiment satisfies the inventive conditions with respect to both of inner and outer rings, but even if the only inner ring satisfies the inventive conditions, the rolling bearing of the invention can obtain better impact resistance (the impression resistance) and the fretting resistance than the conventional art rolling bearings.

As discussed above, according to the rolling bearing of the invention, available are the better impact resistance (the impression resistance) and fretting resistance than those of the conventional rolling bearings, so that the excellent acoustic characteristic can be provided even if being exposed to vibrations or effected with impact load. Thus, the rolling bearing suited to the miniaturized information machinery worked by carrying with users may be provided.

While only certain embodiments of the invention have been specifically described herein, it will apparent that numerous modifications may be made thereto without departing from the spirit and scope of the invention.

What is claimed is:

1. A rolling bearing including an outer ring having an outer raceway surface, at least one of an inner ring having an inner raceway surface and a shaft integrally formed with an inner raceway surface, and a plurality of rolling elements rotatably disposed between said outer raceway surface and said inner raceway surface, wherein, of the inner ring and the outer ring, at least said inner ring is fabricated with a bearing steel containing a carbon content of 0.6 wt % or more, at least said inner raceway surface has a carbonitrided layer, and in at least said inner ring, a multiple Gd of an impression resistance expressed with the following formula (1) is 1.6 or more, $$Gd=(H_{0.2}/500)+2 \cdot Np \qquad (1),$$

wherein NP is a nitrogen content (wt %) at a position of 2% Da depth which is located from the raceway surface to the side of a core portion by the amount of a dimension corresponding to 2% of the diameter of the rolling element and $H_{0.2}$ is a Vickers hardness (Hv) at the position of 2% Da depth.

2. The rolling bearing as set forth in claim 1, wherein said nitrogen content (Np) is 0.05 wt % or more.

3. The rolling bearing as set forth in claim 1, wherein said nitrogen content (Np) is 0.1 wt % or more.

4. The rolling bearing as set forth in claim 1, wherein the amount of a residual austenite ($\gamma_p$) in at least the inner raceway surface is 1.0 vol % or less, and at least said inner raceway surface has a carbonitrided layer which is tempered at 250° C. or higher after performing a sub-zero treatment.

5. The rolling bearing as set forth in claim 2, wherein the amount of a residual austenite ($\gamma_p$) in at least the inner raceway surface is 1.0 vol % or less, and at least said inner raceway surface has a carbonitrided layer which is tempered at 250° C. or higher after performing a sub-zero treatment.

6. The rolling bearing as set forth in claim 3, wherein the amount of a residual austenite ($\gamma_p$) in at least the inner raceway surface is 1.0 vol % or less, and at least said inner raceway surface has a carbonitrided layer which is tempered at 250° C. or higher after performing a sub-zero treatment.

7. The rolling bearing as set forth in any one of claims 1 to 6, wherein a blank material for the rolling element contains chromium of 8 wt % or more, and a surface layer of the rolling element has a nitrided layer of Vickers hardness (Hv) being 1000 or more.

8. The rolling bearing as set forth in anyone of claims 1 to 6, wherein a difference between the surface hardness of the rolling elements and the hardness at the position of 2%Da depth in at least the inner ring is Hv 300 or higher.

* * * * *